United States Patent
Choi et al.

(10) Patent No.: US 7,609,727 B2
(45) Date of Patent: Oct. 27, 2009

(54) APPARATUS FOR TRANSMITTING/RECEIVING COMMUNICATION AND BROADCASTING DATA USING MULTIPLEXING AT TRANSMISSION CONVERGENCE LAYER

(75) Inventors: Dong-Joon Choi, Daejon (KR); O-Hyung Kwon, Daejon (KR); Soo-In Lee, Daejon (KR)

(73) Assignee: Electronics and Telecommunications Research Institute, Daejon (KR)

( * ) Notice: Subject to any disclaimer, the term of this patent is extended or adjusted under 35 U.S.C. 154(b) by 521 days.

(21) Appl. No.: 11/259,969

(22) Filed: Oct. 26, 2005

(65) Prior Publication Data

US 2006/0133398 A1    Jun. 22, 2006

(30) Foreign Application Priority Data

Dec. 16, 2004    (KR) ............... 10-2004-0106801

(51) Int. Cl.
   *H04J 3/06*    (2006.01)
(52) U.S. Cl. ..................................... 370/503
(58) Field of Classification Search .............. 725/82, 725/85, 87, 90, 91, 135, 136, 138, 139
   See application file for complete search history.

(56) References Cited

U.S. PATENT DOCUMENTS

| | | | |
|---|---|---|---|
| 6,377,588 | B1 | 4/2002 | Osaki |
| 2002/0091866 | A1 | 7/2002 | Perlman |
| 2003/0058887 | A1 | 3/2003 | Dworkin et al. |
| 2003/0079230 | A1* | 4/2003 | Woodward et al. ............ 725/90 |
| 2004/0181811 | A1 | 9/2004 | Rakib |
| 2004/0264929 | A1* | 12/2004 | Lee et al. ...................... 386/95 |

FOREIGN PATENT DOCUMENTS

| | | |
|---|---|---|
| JP | 2002-094533 | 3/2002 |
| KR | 102003006622 A | 8/2003 |
| KR | 102004005648 A | 7/2004 |
| KR | 102004009985 A | 12/2004 |

OTHER PUBLICATIONS

"Supporting MPEG Video Transport on DOCSIS-Compliant Cable Networks", D. Bushmitch, IEEE Journal on Selected AReas in Communications, vol. 18, No. 9, Sep. 2000, pp. 1581-1596.

* cited by examiner

*Primary Examiner*—Chirag G Shah
*Assistant Examiner*—Otis L Thompson, Jr.
(74) *Attorney, Agent, or Firm*—Blakely Sokoloff Taylor & Zafman

(57) ABSTRACT

Provided is an apparatus for transmitting/receiving communication and broadcasting data. The transmitting apparatus includes: a mapper for mapping inputted broadcasting data into a transport stream according to a predetermined standard; a broadcasting buffer for temporarily storing the mapped transport stream for multiplexing; a communication buffer for temporarily storing a communication data stream for multiplexing; a counter for measuring data rate information of a broadcasting stream inputted between two SYNC signals and outputting the measured data rate; an SYNC signal generator for generating an SYNC signal for synchronization between the transmitting apparatus and a receiving part and periodically transmitting the generated SYNC signal; and a multiplexer for multiplexing a communication stream, a broadcasting stream, and an SYNC signal.

13 Claims, 7 Drawing Sheets

APPARATUS FOR TRANSMITTING/RECEIVING COMMUNICATION AND BROADCASTING DATA USING MULTIPLEXING AT TRANSMISSION CONVERGENCE LAYER

FIELD OF THE INVENTION

The present invention relates to an apparatus for transmitting/receiving communication and broadcasting data using multiplexing at a transmission convergence layer; and, more particularly, to an apparatus for transmitting/receiving communication and broadcasting data using multiplexing at a transmission convergence layer used for transmitting an A/V MPEG-2 TS over a DOCSIS channel.

DESCRIPTION OF RELATED ART

In the existing cable network, broadcasting data and communication data are transmitted over different physical channels by separate devices.

However, with the trend toward the mergence of communication and broadcasting, there has been introduced a method for transmitting communication and broadcasting data through one device over one channel.

For example, there has been proposed a data transmission method suitable for a transmission rate of 40 Mbps or below under a frequency band of 6 MHz for the existing cable broadcasting.

For the data transmission method, there has been proposed a technique for correcting a timing data during a multiplexing process or inserting a DOCSIS (data over cable service interface specifications) data into a null packet of an A/V MPEG-2 TS (transport stream).

However, this conventional technique cannot enable the commercial chipset to support transmission of wideband high rate data, and cannot support compatibility between devices because it does not follow the basic standard.

Meanwhile, for PCR (program clock reference) correction widely used for re-multiplexing the A/V MPEG-2 TS, it is necessary to maintain a frequency of 27 MHz for MPEG-2 multiplexing in addition to the DOCSIS fundamental frequency of 10.24 MHz and to perform a corresponding operation in accordance with the MPEG-2 multiplexing frequency.

In this case, a general MPEG-2 demultiplexer can operate. However, in case of transmission over a wideband channel using a single frequency, the existing commercial demultiplexer cannot operate.

Also when DOCSIS data are transmitted by multiplexing the A/V MPEG-2 TS, there is a problem in that the existing A/V MPEG-2 TS multiplexer has a row data rate and a jitter may occur in DOCSIS timing data (SYNC message).

Meanwhile, a transmission convergence (TC) layer is separately defined in the downstream standards of the DOCSIS standards for data transmission through a cable. In the TC layer, DOCSIS MAC frames are transmitted on a consecutive MPEG-2 TS stream.

This transmission structure makes it possible to simultaneously multiplex an MPEG-2 TS for transmission of general data on the DOCSIS MAC frame and an MPEG-2 TS for transmission of A/V data and transmit the multiplexed TS over one channel.

Accordingly, this data transmission scheme using a single stream is considered as one transmission scheme in the next generation cable transmission structure.

The DOCSIS MAC frame structure is used for two-way data communication. In case of downstream transmission, all terminals receive the same stream and each terminal transmits its corresponding MAC frame to the upper layer. In upstream transmission, a multiple access scheme sharing the same medium is used.

In the DOCSIS 2.0, TDMA and S-CDMA are adopted as the multiple access schemes. In the multiple access scheme, special attention must be paid to prevent a time or frequency collision from occurring between terminals sharing the same physical medium.

Specifically, a precise synchronization (SYNC) between the terminals must be maintained to prevent the time collision. In the DOCSIS standard, a headend cable modem periodically transits an SYNC message for the precise SYNC, and each terminal transmits upstream data at an assigned time by using an MAP (multiple access protocol) message while maintaining time SYNC by restoring a reference clock from the SYNC message.

Accordingly, in the subsequent transmission process, jitters due to multiplexing or buffering must be prevented from occurring in the SYNC message provided by the headend cable modem.

These jitters in timing data (the SYNC message) must also be strictly prevented in the A/V transmission process. In general, the A/V signal is changed into an ES (elementary stream) by an encoder. In the packetization process for the ES, an ESCR (elementary stream clock reference), a PTS (presentation time stamp) and a DTS (decoding time stamp) are added to a PES header.

These timing data are used for a receiver to decode and demultiplex the A/V signal.

Meanwhile, in an MPEG multiplexing system, a PCR (program clock reference) value for reference SYNC is written in a TS header. The PCR value is determined considering an error during its generation and an error that may be generated during the interim re-multiplexing process. In the MPEG multiplexing system, the PCR is defined to have an accuracy of 500 nsec or smaller, like the DOCSIS standard.

However, a packet arrival time error that may be caused by factors such as a jitter due to buffering during transmission is not considered in determining the PCR value.

Accordingly, in case of the MPEG-2 TS containing the A/V data, a certain transmission delay may be permitted but a variation in the transmission delay must be prevented from deviating from a certain error range.

When an MPEG TS of the DOCSIS channel and an MPEG TS of an A/V encoder are simply multiplexed, the operation of a receiving terminal is abnormally performed due to the abovementioned jitters.

Also, when an A/V MPEG-2 TS and a TS containing a DOCSIS MAC frame are multiplexed prior to transmission, a receiving terminal is unable to accurately detect information on a data rate for each TS.

Accordingly, when the A/V MPEG-2 TS and the DOCSIS MAC frame TS are multiplexed and transmitted using a single carrier, it is necessary to additionally provide the data rate information so that each TS can be normally processed.

Also, the DOCSIS or A/V MPEG-2 TS considers only a jitter that may be generated during transmission at a physical layer, but does not consider a jitter due to MPEG TS packet buffering or multiplexing that may be generated during the transmission of the MPEG-2 TS on a packet basis.

Accordingly, when the A/V MPEG-TS varies in its data rate during transmission or is multiplexed into the MPEG-2 TS, there is required a re-multiplexing process for correcting the timing data of the MPEG-2 TS.

This re-multiplexing process is possible when only the A/V data is transmitted. However, when both the A/V data and the DOCSIS MPEG TS are multiplexed, the re-multiplexing process is difficult to apply because of a difference in reference clocks and timing data.

In summary, in the next generation cable network merging communication and broadcasting, the communication data and the general A/V data are transmitted using a single carrier. Specifically, there may exist various methods in multiplexing both the communication data and the general A/V data in the DOCSIS TC layer and then transmitting the multiplexed signal by using only the existing 6 MHz frequency band.

However, when a wideband channel over the 6 MHz frequency band is used, it is inevitable to discriminatively process the A/V MPEG TS in the DOCSIS TC layer. An attempt has been made to transmit the A/V data over DOCSIS channels such as MPEG-2 over IP. However, this transmission via the IP cannot assure a satisfactory QoS as yet.

Accordingly, it is necessary to multiplex the MPEG TS containing the A/V data on a wideband DOCSIS channel in the TC layer. Also, there is required a scheme for providing communication/broadcasting merged-type service through the existing cable network by solving the problems that may be generated in setting a data rate of the MPEG-2 TS from the A/V encoder. Further, there is required a method for preventing a jitter from occurring in the MPEG-2 TS.

SUMMARY OF THE INVENTION

It is, therefore, an object of the present invention to provide an apparatus for simultaneously transmitting/receiving communication and broadcasting data by simultaneously multiplexing or demultiplexing in the TC layer. In the inventive apparatus, a transmitter inserts information on the A/V MPEG-2 TS into the DOCSIS timing data and a receiver extracts the A/V MPEG-2 TS on the basis of the information.

In accordance with an aspect of the present invention, there is provided an apparatus for transmitting communication and broadcasting data, including: a mapper for mapping inputted broadcasting data into a transport stream according to a predetermined standard; a broadcasting buffer for temporarily storing the mapped transport stream for multiplexing; a communication buffer for temporarily storing a communication data stream for multiplexing; a counter for measuring data rate information of a broadcasting stream inputted between two SYNC signals and outputting the measured data rate; an SYNC signal generator for generating an SYNC signal for synchronization between the transmitting apparatus and a receiving part and periodically transmitting the generated SYNC signal; and a multiplexer for multiplexing a communication stream, a broadcasting stream, and an SYNC signal.

In accordance with another aspect of the present invention, there is provided an apparatus for receiving communication and broadcasting data, including: a splitter for dividing an inputted MPEG-2 TS into a DOCSIS MPEG-2 TS and other streams according to a predetermined process and sequentially outputting the resulting streams; an MPEG-2 TS decapsulator for extracting a DOCSIS MAC frame from the MPEG-2 TS stream; an SYNC detector for outputting a timing data for generating a DOCSIS reference clock when the extracted DOCSIS MAC frame is a SYNC message and outputting data rate information contained in the SYNC message; a data rate controller for controlling an output data rate on the basis of the data rate information; a buffer for temporarily storing an A/V MPEG-2 TS received from the splitter and outputting the MPEG-2 TS to a decoder under the control of the data rate controller; and a decoder for decoding the MPEG-2 TS received from the buffer.

BRIEF DESCRIPTION OF THE DRAWINGS

The above and other objects and features of the present invention will become apparent from the following description of the preferred embodiments given in conjunction with the accompanying drawings, in which.

DETAILED DESCRIPTION OF THE INVENTION

Other objects and aspects of the invention will become apparent from the following description of the embodiments with reference to the accompanying drawings, which is set forth hereinafter.

Figure 1:
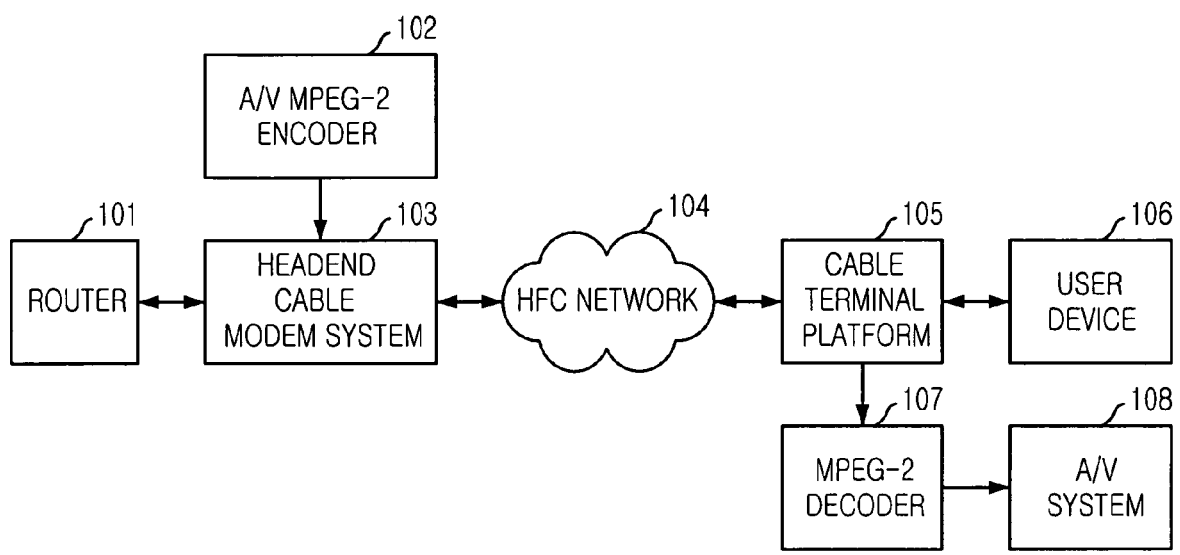
FIG. 1 is a block diagram of a conventional TX/RX system for transmitting/receiving A/V and Internet data via an HFC network.

FIG. 1 is a block diagram of a conventional TX/RX system for transmitting/receiving A/V and Internet data via an HFC network.

FIG. 1 is a block diagram of a conventional TX/RX system for transmitting/receiving A/V and Internet data via an HFC (hybrid fiber coaxial) network, to which the present invention is applied.

Referring to FIG. 1, IP based data received from a router 101 connected to the Internet and MPEG-2 TS data received from an A/V MPEG-2 encoder 102 are inputted to a headend cable modem system 103.

The headend cable modem system 103 multiplexes and modulates the inputted data and then transmits the resulting data to subscribers via an HFC network 104.

At this time, the Internet data is transmitted through the DOCSIS based transmission protocol, and the A/V MPEG-2 data is multiplexed in the DOCSIS TC layer and then transmitted.

A cable terminal platform 105 demodulates the data received from the HFC network 104.

The demodulated data is outputted in the form of one MPEG-2 TS and an A/V MPEG-2 TS is separated therefrom. The A/V MPEG-2 TS is processed by an MPEG-2 decoder 107. The processed A/V MPEG-2 is inputted to a general A/V system 107 such as TV.

DOCSIS based data are processed into DOCSIS MAC layer data by the cable terminal platform and is then transmitted to a user device 106.

Figure 2:
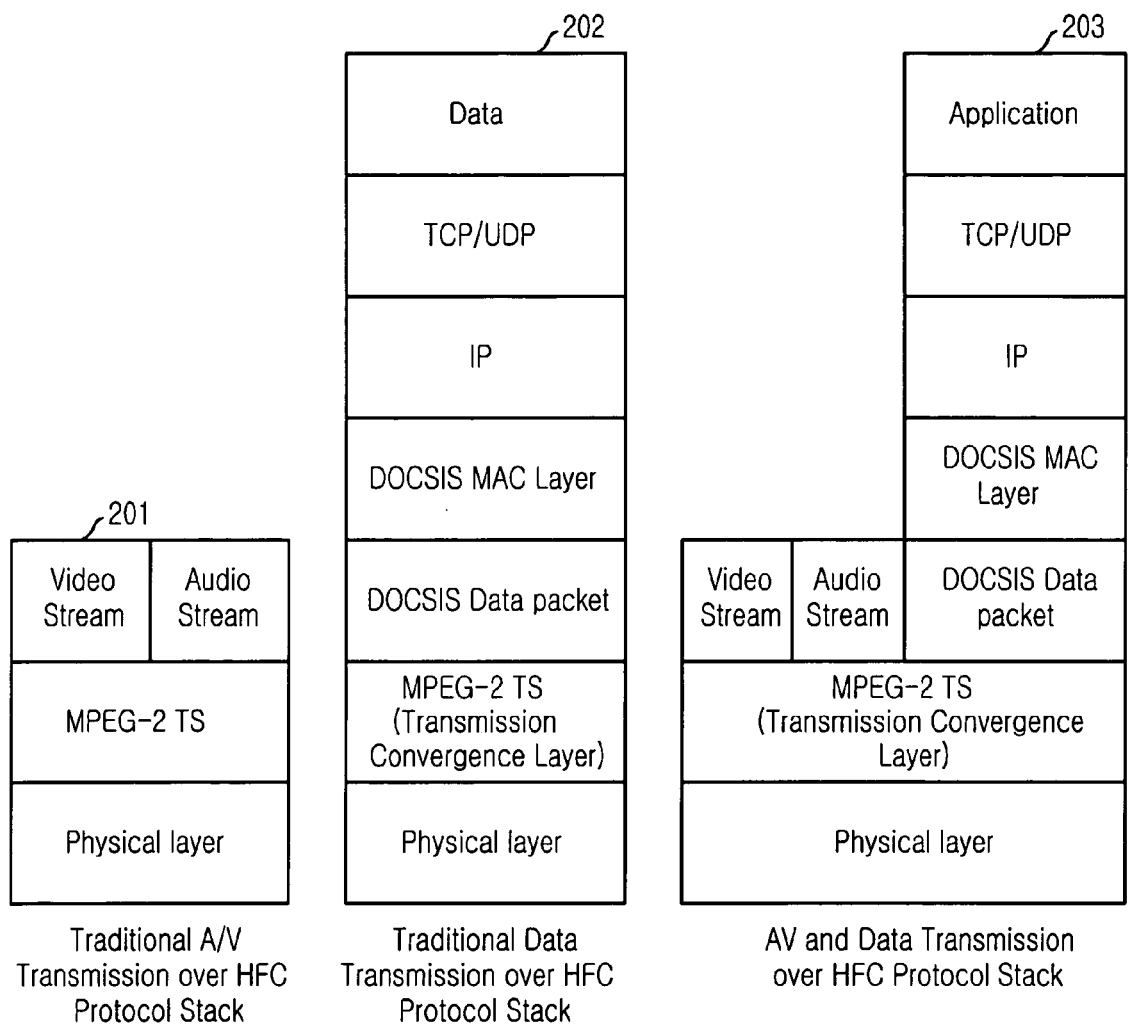
FIG. 2 is a diagram illustrating a traditional A/V transmission protocol stack, a traditional data transmission protocol stack, and an AV/data merged-type transmission protocol stack.

FIG. 2 is a diagram illustrating a traditional A/V transmission protocol stack, a traditional data transmission protocol stack, and an A/V-data merged-type transmission protocol stack.

Referring to FIG. 2, in the traditional A/V transmission protocol stack, traditional A/V data is compressed and then transmitted in the form of the MPEG-2 TS.

In the conventional digital cable broadcasting, a single MPEG-2 TS outputted from an A/V encoder is QAM-modulated and transmitted over one 6 MHz band while IP-based data using the cable network is converted into a DOCSIS MAC frame.

At this time, the DOCSIS MAC frame is variable in length. In the traditional data transmission protocol stack, this DOCSIS MAC frame is constructed in the form of an MPEG-2 TS with a length of 188 bytes and is QAM-modulated and transmitted over the 6 MHz band.

The A/V data and the Internet data are transmitted over different frequency bands through the existing cable network.

In the A/V-data merged-type transmission protocol stack, an MPEG-2 TS stream is multiplexed in one wideband and then transmitted.

Figure 3:
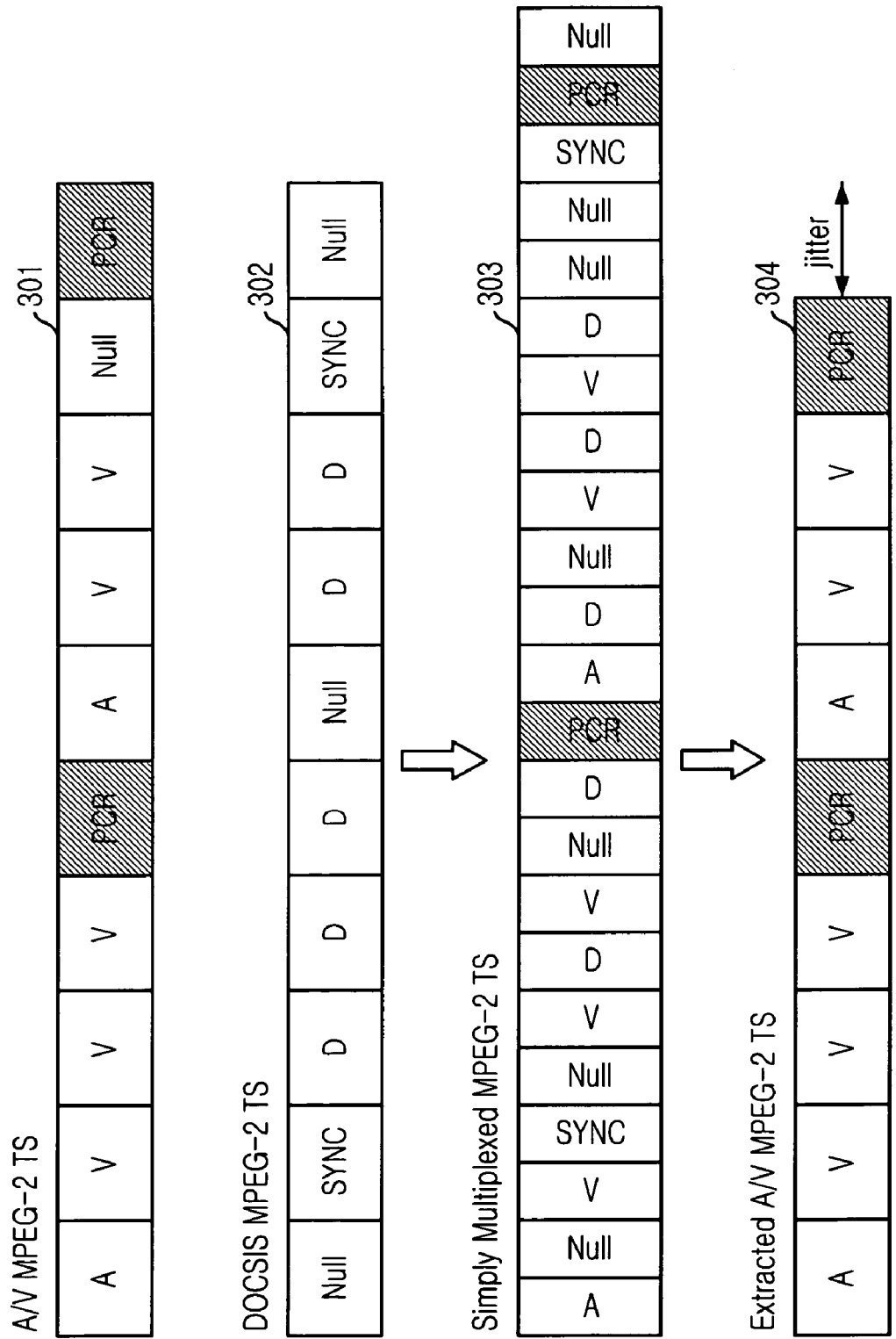
FIG. 3 is a diagram illustrating jitters generated at timing data contained in a traditional DOCSIS MAC frame and an A/V MPEG-2 stream.

FIG. 3 is a diagram illustrating jitters generated at timing data contained in a DOCSIS MAC frame and an A/V MPEG-2 stream when the traditional multiplexing method is used.

Referring to FIG. 3, an A/V MPEG-2 TS 301 includes a TS containing A/V data, a packet containing a PCR for transmitting a timing data to a decoder, and a null packet for adjusting a data rate.

A DOCSIS MAC frame is variable in length. Burst data is generated when the DOCSIS Mac frame is converted into a DOCSIS MPEG-2 TS 302. Accordingly, when there is no data, a null packet is inserted into the DOCSIS MPEG-2 TS 302.

When the two MPEG-2 TSs 301 and 302 are multiplexed into a fast single stream prior to transmission, a simple multiplexed MPEG-2 TS 303 has different time positions when a data rate of a multiplexed data cannel is not the integral multiple of the A/V MPEG-2 TS. That is, a jitter is generated.

Also, an extracted A/V MPEG-2 TS 304 has a PCR jitter generated, since the A/V MPEG-2 TS 301, the DOCSIS MPEG-2 TS and the null packet inserted for output adjustment are not discriminated from one another and thus the relative position of the PCR is changed.

Figure 4:
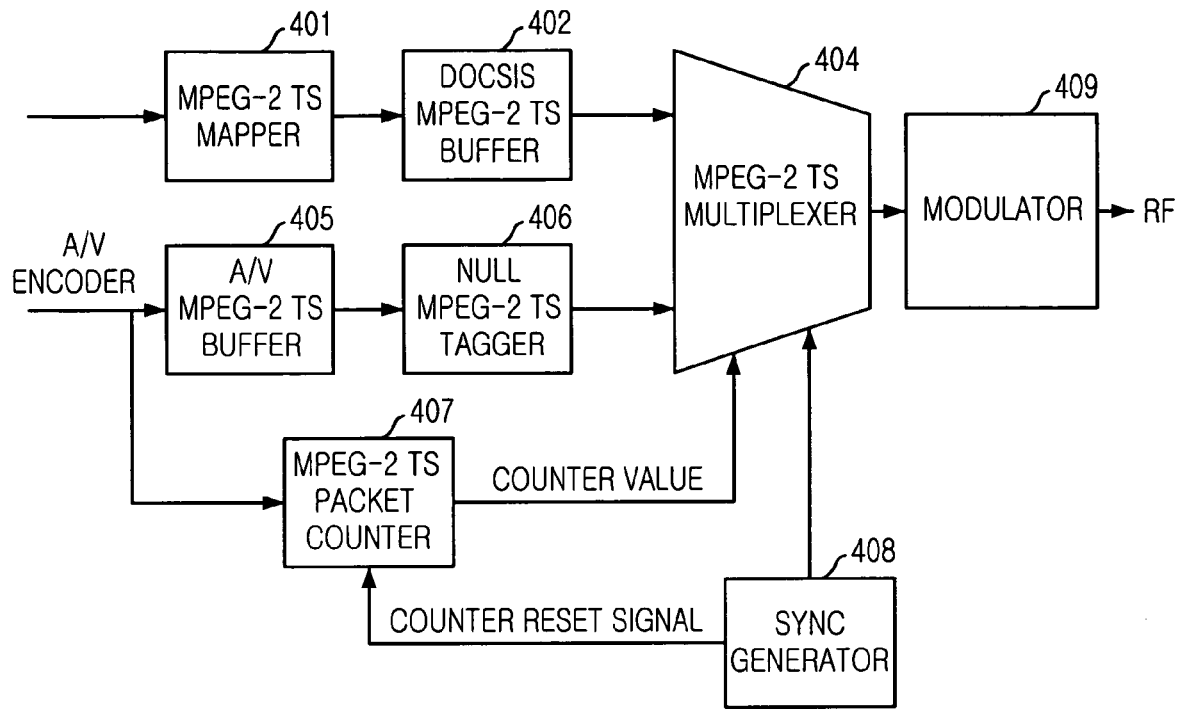
FIG. 4 is a block diagram of an apparatus for transmitting communication and broadcasting data using multiplexing at a TC layer in accordance with an embodiment of the present invention.

FIG. 4 is a block diagram of an apparatus for transmitting communication and broadcasting data using multiplexing at an MPEG-2 TC layer in accordance with an embodiment of the present invention.

The inventive transmission apparatus multiplexes, in a TC layer, an MPEG-2 TS containing the traditional DOCSIS MAC frame and an MPEG-2 TS containing A/V data and transmits the resulting signal over one stream.

Referring to FIG. 4, an MPEG-2 TS mapper 401 maps an inputted DOCSIS MAC frame into an MPEG-2 TS as defined in the DOCSIS 2.0. A PID value of the so-generated MPEG-2 TS header is set to 0x1FFE. A "payload_unit_start_indicator" bit of the header indicates whether or not the fifth byte of the MPEG-2 TS is used as a pointer of a fee-charging data.

A DOCSIS MPEG-2 TS buffer 402 temporarily stores the MPEG-2 TS data from the MPEG-2 TS mapper 401 so as to multiplex an A/V MPEG-2 TS.

An A/V MPEG-2 TS buffer 405 temporarily stores a TS received from an A/V encoder so as to multiplex and transmit the TS in a TC layer.

A null MPEG-2 Ts tagger 406 sets the "payload_unit_start_indicator" bit to "1" so as to discriminate a null packet contained in the TS from a null packet contained in the MPEG-2 TS.

An MPEG-2 packet counter 107 provides information on a data rate of the A/V MPEG-2 TS multiplexed in the DOCSIS TC layer. The MPEG-2 packet counter 107 is initialized at the time when a DOCSIS SYNC message is transmitted. The MPEG-2 packet counter 107 indicates the number of MPEG TSs inputted until the DOCSIS SYNC message is transmitted, and the number of bytes transmitted over MPEG-2 TS when the MPEG-2 TS is not completely transmitted at that time.

An SYNC generator 408 periodically transmits SYNC data, that is, a SYNC message, for synchronization between a transmitting system and a receiving terminal on the basis of the DOCSIS 2.0.

Also, when a SYNC signal for informing periodic SYNC generation is generated, the SYNC generator 408 obtains information form the MPEG-2 TS packet counter 407 and performs an initialization operation. The obtained information is provided to the MPEG-2 TS multiplexer 404.

At this time, the SYNC message is transmitted every 0.2 second. Also, the number of packets in the MPEG-2 TS and the number of bytes in the MPEG-2 TS are represented using the obtained information and a time stamp.

Unlike a general MPEG-2 TS multiplexer and a re-multiplexer, the MPEG-2 TS multiplexer 404 multiplexes and outputs the mapped and stored DOCSIS MPEG-2 TS packet, the stored MPEG-2 TS received form the A/V encoder, and the MPEG-2 TS packet generated by the SYN signal, according to their priority.

Also, the MPEG-2 TS multiplexer 404 inserts an SYNC message into the MPEG-2 TS packet generated by the SYN signal. A timestamp containing the SYNC message is set to a value at the time when the MPEG-2 TS containing the SYNC message is outputted.

Figure 7:
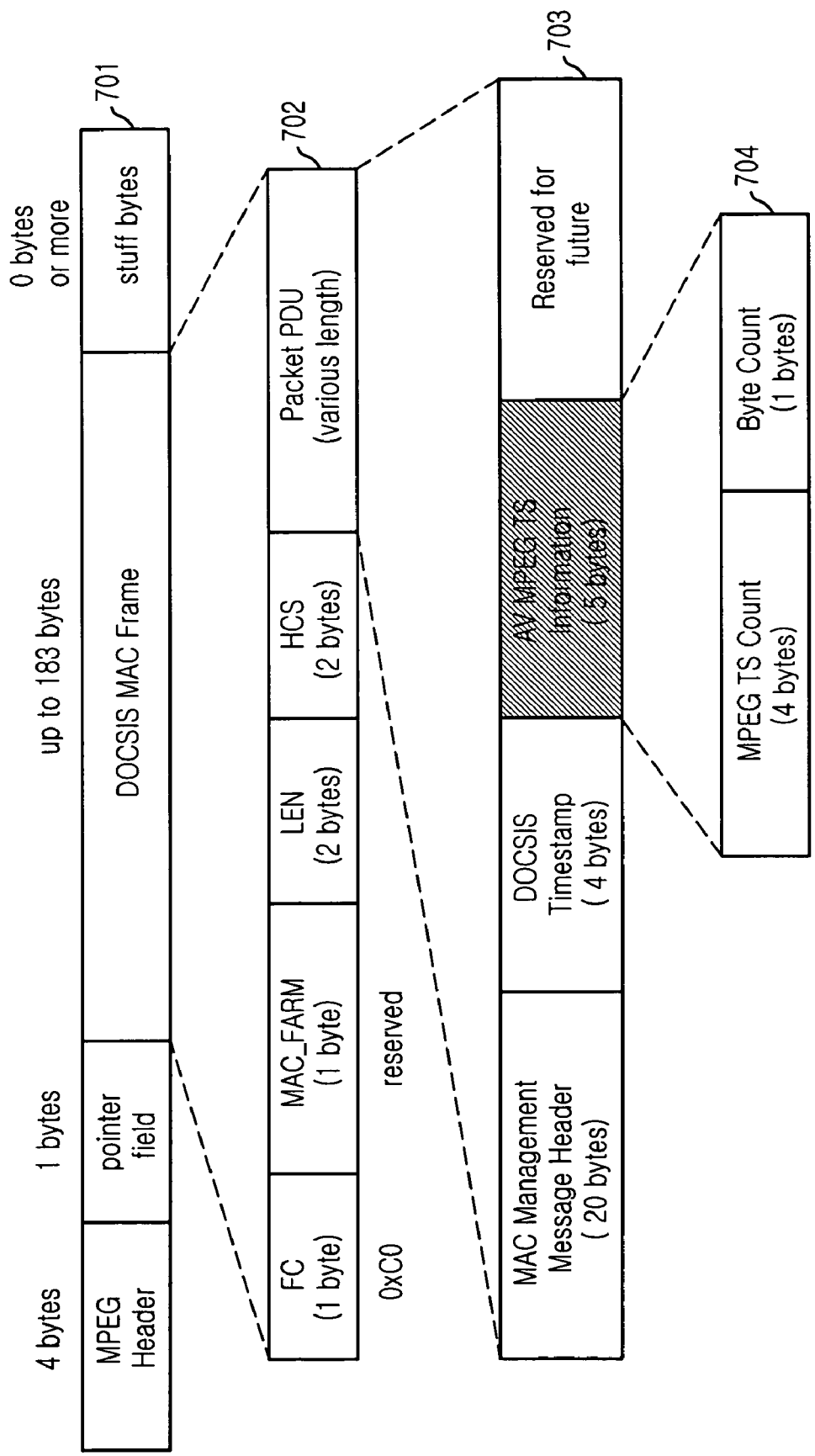
FIG. 7 is a diagram illustrating a format of a DOCSIS SYNC message for inserting A/V MPEG-2 TS data rate information in accordance with an embodiment of the present invention.

At this time, a value from the MPEG-2 packet counter 407 is inserted into the SYNC message as illustrated in FIG. 7.

Regarding priority for multiplexing, the MPEG-2 TS for the SYNC message has the highest priority, the MPEG-2 TS for the A/V data has the first priority, and the MPEG-2 TS for the DOCSIS MAC frame has the second priority.

A modulator 409 modulates the multiplexed MPEG-2 TS and outputs the modulated signal to an HFC network.

The MPEG-2 TS packet counter 407 measures the amount of transmission data of the A/V MPEG-2 TS and provides the measured vale to the MPEG-2 TS multiplexer 404.

Figure 5:
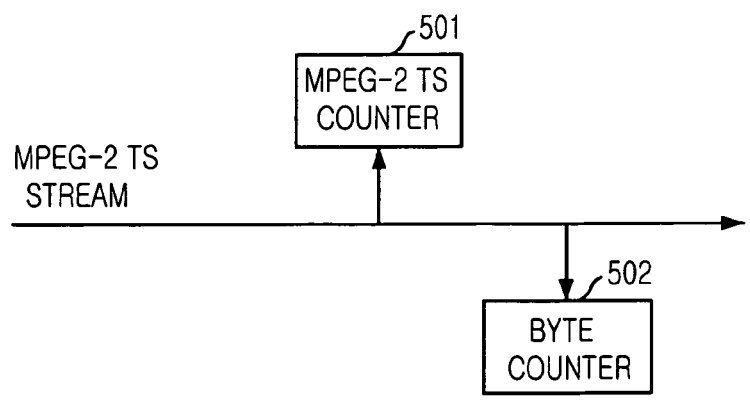
FIG. 5 is a block diagram of an MPEG-2 TS packet counter in accordance with an embodiment of the present invention.

FIG. 5 is a block diagram of the MPEG-2 TS packet counter 407 in accordance with an embodiment of the present invention.

Referring to FIG. 5, the MPEG-2 TS packer counter 407 includes an MPEG-2 TS counter 501 and a byte counter 502 so as to measure the amount of transmission data of the A/V MPEG-2 TS inputted between two SYNC signals and to provide the measured value to the MPEG-2 TS multiplexer 404.

The MPEG-2 TS counter 501 indicates the number of A/V MPEG-2 TS packets inputted between the two SYNC signals and increase the number by "1" whenever one MPEG-2 TS packet is inputted. When a signal is generated from the SYNC generator 408, the MPET-2 TS counter 501 transmits a current value to the MPEG-2 TS multiplexer 404 and then initializes the counter to "0".

The byte counter 502 indicates the number of bytes received from the MPEG-2 TS SYNC byte. The byte counter 502 sets the number to "0" when the MPEG-2 TS SYNC byte is detected, and increases the number by "1" whenever one byte is transmitted. Also, when a signal is generated from the SYNC generator 408, the MPET-2 TS counter 501 transmits a current value to the MPEG-2 TS multiplexer 404 and then initializes the counter to "0".

Figure 6:
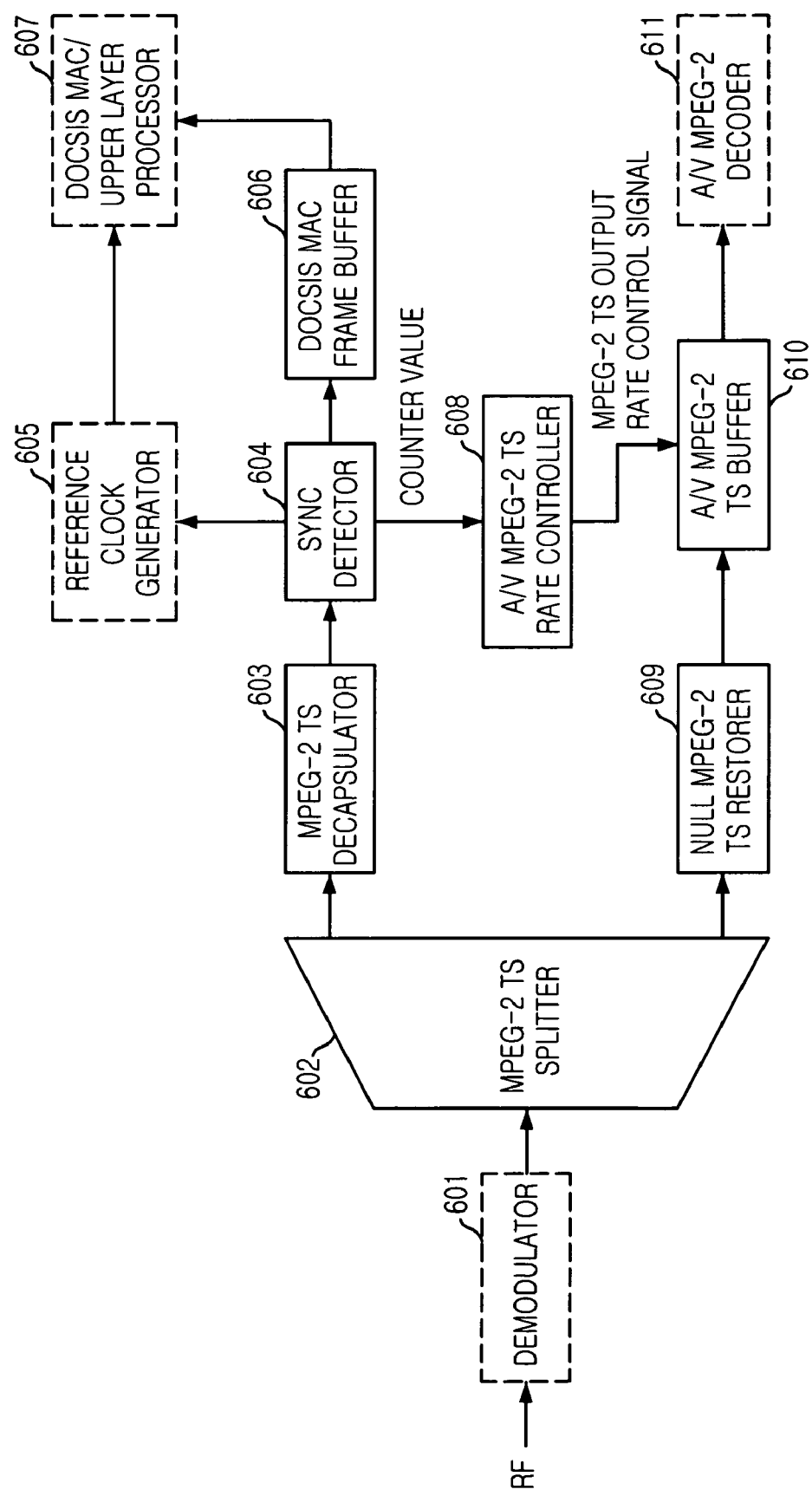
FIG. 6 is a block diagram of an apparatus for receiving communication and broadcasting data using multiplexing at a TC layer in accordance with an embodiment of the present invention.

FIG. 6 is a block diagram of an apparatus for receiving communication and broadcasting data using multiplexing at a TC layer in accordance with an embodiment of the present invention.

The inventive receiving apparatus restores the A/V data so as to extract the A/V MPEG-2 TS when the A/V data is transmitted in the DOCSIS TC layer.

Referring to FIG. 6, a demodulator 601 demodulates an RF signal received from the HFC network into an MPEG-2 TS.

An MPEG-2 TS splitter 602 splits the MPEG-2 TS from the demodulator 601 into a DOCSIS MPEG-2 TS and other streams and sequentially outputs the resulting streams.

The MPEG-2 TS splitting process includes the following three steps.

In the first step, when a PID value of the MPEG-2 TS header is "0x1FFE", it is outputted to an MPEG-2 TS decapsulator 603 for processing a DOCSIS MAC frame.

In the second step, when the PID value of the MPEG-2 TS header is "0x1FFF" and when a "payload_unit_start_indicator" bit of the header is set to "1", the bit is reset to "0" and is outputted through a null MPEG-2 TS restorer 609 to an A/V MPEG-2 TS buffer 610. When the "payload_unit_start_indicator" bit of the header is set to "1" is set to "1", a corresponding TS packet is discarded.

In the third step, when the PID value of the MPEG-2 TS header is neither "0x1FFE" nor "0x1FFF", the value is outputted to the A/V MPEG-2 TS buffer 610.

The MPEG-2 TS decapsulator 603 extracts a DOCSIS MAC frame from the MPEG-2 TS stream. When the extracted DOCSIS MAC frame is not an SYNC message, the MPEG-2 TS decapsulator 603 outputs the MAC frame to a DOCSIS MAC frame buffer 606.

When the extracted DOCSIS MAC frame is the SYNC message, an SYNC detector 604 outputs a timing data for generating a DOCSIS reference clock and outputs information on an A/V MPEG-2 TS data rate contained in the SYNC message to an A/V MPEG-2 TS rate controller 608.

A reference clock generator 605 generates a reference clock of the receiving terminal on the basis of timing data of the extracted SYNC message.

A DOCSIS MAC/upper layer processor 607 divides the DOCSIS MAC frame stored in the DOCSIS MAC frame buffer 606 into a DOCSIS management message and user data, and provides the user data to a user device.

The A/V MPEG-2 TS rate controller 608 controls an A/V MPEG-2 TS output data rate on the basis of the A/V MPEG-2 TS data rate information (an MPEG-2 TS counter value and a byte counter value) contained in the DOCSIS SYNC message.

The A/V MPEG-2 TS buffer 610 stores the A/V MPEG-2 TS extracted by the MPEG-2 TS splitter 602, and outputs the MPEG-2 TS to an A/V MPEG-2 decoder 611 under the control of the A/V MPEG-2 TS rate controller 608.

The A/V MPEG-2 decoder 611 decodes the inputted A/V MPEG-2 TS.

The output data rate is calculated using the MPEG TS counter value, the byte counter value and the timestamp contained in the SYNC message through the following method.

When a new SYNC message arrives, a new counter value and a new timestamp are available. Assuming that the new MPEG-2 TS counter value and the new byte counter value are respectively "TS_counter(i)" and "byte_counter(i)", the total number "Total-byte(i)" of A/V MPEG-2 TS transmission bytes between two SYNC messages is expressed as Equation 1 below.

$$\text{Total\_Byte}(i) = 188 \times TS\_\text{counter}(i) + (188 - \text{byte\_counter}(i-1)) + \text{byte\_counter}(i) \quad (1)$$

Here, "byte_counter(i-1)" means a byte counter value received by the previous SYNC message.

Also, assuming that a time value of a newly-received SYNC message is "SYNC(i)", a time difference "Time_Difference(i)" between the two SYNC messages is expressed as Equation (2) below.

$$\text{Time\_Difference}(i) = \frac{|SYNC(i) - SYNC(i-1)|}{\text{master\_clock\_frequency}} \quad (2)$$

Here, "SYNC(i-1)" is a time value contained in the previous SYNC message, and "master_clock_frequency" is a frequency that the headend modem uses for generation of the SYNC message. The frequency is set to 10.24 MHz in the DOCSIS standard.

Accordingly, the A/V MPEG-2 TS output data rate at the arrival of the new message is expressed as Equation 3 below.

$$\text{TS\_Rate}(i) = \frac{\text{Total\_Byte}(i)}{\text{Time\_Difference}(i)} \quad (3)$$

The A/V MPEG-2 output data rate is newly calculated whenever the SYNC message arrives, and thus the output data rate can be controlled using only the calculated value.

In this case, the output data rate may be rapidly changed due to unexpected conditions (such as transmission error). However, a TS data rate actually outputted from an encoder is nearly constant or is not changed rapidly.

Accordingly, the output data rate is controlled using the previous value instead of being set to a newly-calculated value according to systems used. One of the methods is to set an actual output data rate by averaging the calculated output data rate and the previous data rate values.

FIG. 7 is a diagram illustrating a format of a DOCSIS SYNC message for inserting A/V MPEG-2 TS data rate information in accordance with an embodiment of the present invention.

Referring to FIG. 7, a message 701 is a modified message for providing the A/V MPEG-2 output data rate information to the SYNC message among the DOCSIS management messages.

In order to divide the MPEG-2 TS into the DOCSIS MAC frame and the A/V MPEG-2 TS in the TC layer and to restore them in a receiving terminal, the A/V MPEG-2 TS data rate information is needed.

A message 703 is constituted by 5 bytes after "Timestamp" of a DOCSIS SYNC message 702. At this time, an MPEG-2 TS containing the DOCSIS SYNC message includes only an SYNC message, and does not include other DOCSIS frames.

As illustrated by reference numeral "704", an MPEG-TS counter value is expressed by a 4-byte integer and a byte counter value is expressed by one byte. Consequently, additional information expressed by a total of 5 bytes is provided.

Figure 8:
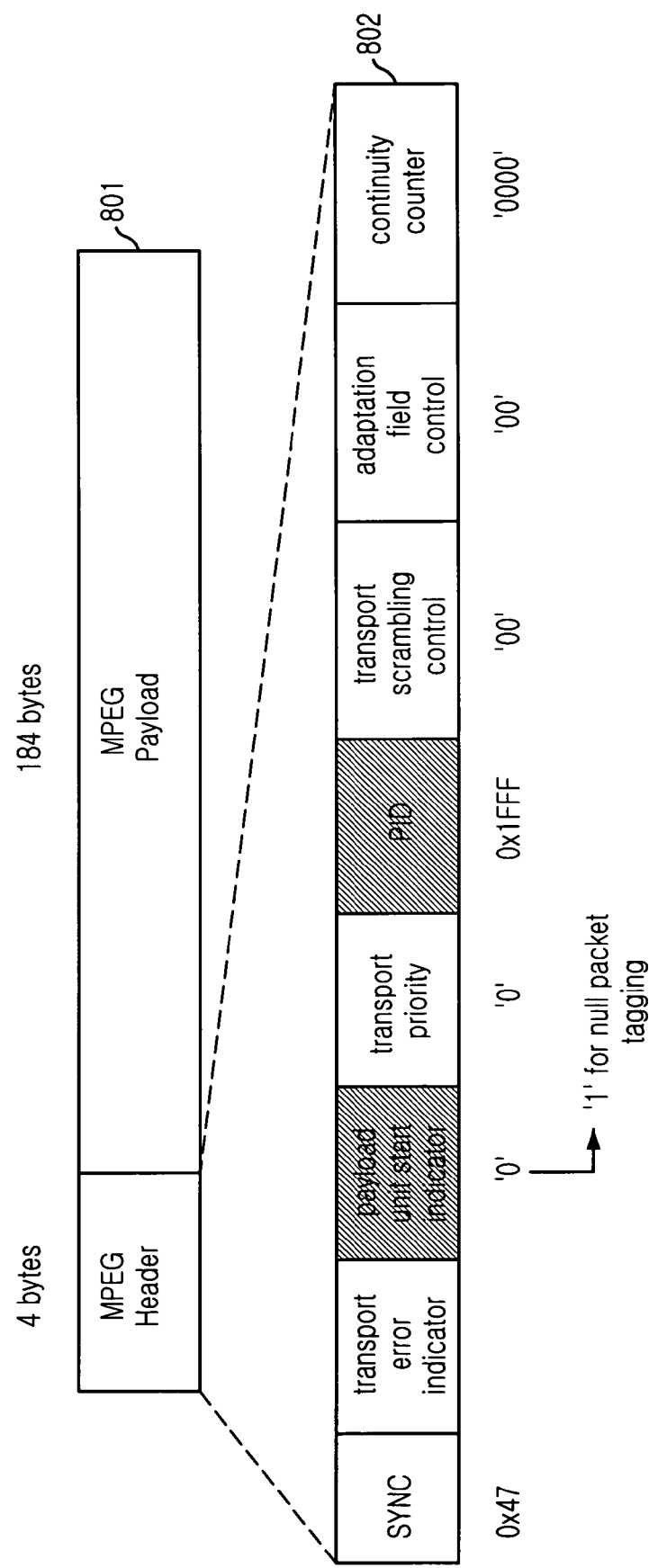
FIG. 8 is a diagram illustrating a modified format of a null packet contained in an A/V MPEG-2 TS in accordance with an embodiment of the present invention.

FIG. 8 is a diagram illustrating a modified format of a null packet contained in an A/V MPEG-2 TS in accordance with an embodiment of the present invention.

As illustrated by reference numeral "802", a "payload unit start indicator" bit of a general null packet is set to "0". Unlikely, a "payload unit start indicator" bit of a null packet contained in a DOCSIS MAC frame MPEG-2 TS and a non-multiplexed A/V MPEG-2 TS is set to "1".

Also, a receiving terminal restores a "payload unit start indicator" bit of a null packet contained in the A/V MPEG-2 TS to "0".

Table 1 below shows the simulation results where the DOCSIS data and the A/V data are multiplexed and transmitted in accordance with a preferred embodiment of the present invention.

TABLE 1

| MMPP source average bitrate (Mbps) | DOCSIS Traffic Burstiness | AV TS Ave. Jitter (nsec) | AV TS MAX. Jitter (nsec) | DOCSIS TS mean delay (usec) | DOCSIS TS MAX. delay (usec) | DOCSIS Max Queue (packets) |
|---|---|---|---|---|---|---|
| 252.457143 | 1.702128 | 148.6811 | 168.1006 | 224.08 | 2874.73 | 536 |
| 225.600000 | 1.666667 | 148.6811 | 168.1006 | 78.93 | 1229.59 | 230 |
| 188.000000 | 1.600000 | 148.6811 | 168.1006 | 24.53 | 363.14 | 68 |
| 162.933333 | 1.538462 | 148.6811 | 168.1006 | 12.45 | 191.00 | 36 |
| 131.600000 | 1.428571 | 148.6811 | 168.1006 | 6.76 | 106.45 | 21 |
| 112.800000 | 1.333333 | 148.6811 | 168.1006 | 5.29 | 77.49 | 15 |
| 100.266667 | 1.250000 | 148.6811 | 168.1006 | 4.67 | 74.78 | 14 |
| 91.314286 | 1.176471 | 148.6811 | 168.1006 | 4.35 | 54.59 | 11 |
| 84.600000 | 1.111111 | 148.6811 | 168.1006 | 4.16 | 56.60 | 12 |
| 75.200000 | 1.000000 | 148.6811 | 168.1006 | 3.96 | 47.03 | 9 |

In the simulation, the maximum jitter generated at the A/V MPEG-2 TS, the transmission delay of the DOCSIS data, and the required buffer capacity are measured when an A/V data rate is 120 Mbps and a DOCSIS data rate is 75.2~252.457143 Mbps. It can be seen from the results of the simulation that the jitter of the A/V MPEG-2 TS is about 168 nsec irrespective of the amount of the DOCSIS data, which does not exceeds an allowable range of 500 nsec.

The method in accordance with the present invention can be stored in computer-readable recording media (CD-ROM, RAM, ROM, floppy disk, hard disk, magneto-optical disk).

As described above, the transmitting/receiving apparatus according to the present invention can transmit/receive communication and broadcasting data through multiplexing at the TC layer.

Also, the transmitting apparatus inserts information on the A/V MPEG-2 TS into the DOCSIS timing data and the receiving apparatus extracts the A/V MPEG-2 TS by using the information. Accordingly, the A/V MPEG-2 TS can be simultaneously multiplexed and transmitted at the transmitting apparatus on the basis of the existing DOCSIS transmission scheme and the A/V MPEG-2 TS can be extracted and demultiplexed at the receiving apparatus.

Also, the communication/broadcasting merged-type service can be efficiently provided through a wideband channel.

Also, the headend and terminal devices can be embodied through the existing device and the commercial chipset.

The present application contains subject matter related to Korean patent application No. 2004-0106801, filed with the Korean Intellectual Property Office on Dec. 16, 2004, the entire contents of which is incorporated herein by reference.

While the present invention has been described with respect to certain preferred embodiments, it will be apparent to those skilled in the art that various changes and modifications may be made without departing from the scope of the invention as defined in the following claims.

What is claimed is:

1. An apparatus to transmit communication and broadcasting data, comprising:
    a mapper to map input communication data into a communication stream according to a predetermined standard;
    a broadcasting buffer to temporarily store a broadcasting stream for multiplexing;
    a communication buffer to temporarily store the communication stream for multiplexing;
    a counter to measure data rate information of the broadcasting stream inputted between two SYNC signals and output the measured data rate;
    an SYNC signal generator to generate the SYNC signals for synchronization between the transmitting apparatus and a receiving part, and periodically transmit the generated SYNC signals; and
    a multiplexer to multiplex the communication stream and the broadcasting stream based on the measured data rate to output a transport stream,
    wherein the transport stream is an MPEG-2 TS, the communication stream is an MPEG-2 TS into which a DOCSIS MAC frame is mapped, and the broadcasting stream in an A/V MPEG-2 TS, wherein the counter includes:
        an MPEG-2 TS counter to indicate the number of A/V MPEG-2 TS packets input between the two SYNC signals; and
        a byte counter to detect and set an MPEG-2 TS SYNC byte to "0".

2. The apparatus as recited in claim 1, further comprising:
    a tagger to tag a null packet for discrimination of sources; and
    a modulator to modulate the transport stream output from the multiplexer.

3. The apparatus as recited in claim 1, wherein the MPEG-2 TS counter increases the number by "1" whenever one MPEG-2 TS packet is input, and transmits a current value to the multiplexer and to initialize a counter to "0" when the SYNC signal is generated from the SYNC signal generator, and the byte counter increases the byte by "1" whenever one byte is transmitted, transmits a current value to the multiplexer and initializes counter to "0" when the SYNC signal is generated from the SYNC signal generator.

4. The apparatus as recited in claim 1, wherein the data rate information includes the number of MPEG-2 TS packets and the number of the MPEG-2 TS bytes.

5. The apparatus as recited in claim 4, wherein the SYNC signal includes information on the packet number and the byte number.

6. The apparatus as recited in claim 1, wherein the multiplexer performs the multiplexing and outputting of MPEG-2 TS packets generated based on the SYNC signal according to priority.

7. The apparatus as recited in claim 1, wherein the multiplexer generates an SYNC message using the SYNC signal.

8. The apparatus as recited in claim 7, wherein a timestamp is set using a value at the time when the MPEG-2 TS containing the SYNC message is outputted.

9. An apparatus to receive communication and broadcasting data, comprising:
    a splitter to divide an input MPEG-2 TS into a DOCSIS MPEG-2 TS and other streams according to a predetermined process and sequentially output the resulting streams;
    an MPEG-2 TS decapsulator to extract a DOCSIS MAC frame from the MPEG-2 TS stream;
    a SYNC detector to output a timing data to generate a DOCSIS reference clock when the extracted DOCSIS MAC frame is a SYNC message, and to output data rate information contained in the SYNC message;
    a data rate controller to control an output data rate on the basis of the data rate information;
    a buffer to temporarily store an A/V MPEG-2 TS received from the splitter, and to output the A/V MPEG-2 TS under the control of the data rate controller; and
    a decoder to decode the A/V MPEG-2 TS received from the buffer,
    wherein the predetermined process includes:
        a first operation to output a PID value to the decapsulator when the PID value of the MPEG-2 TS header is "0x1FFE";
        a second operation to reset a "payload unit start indicator" bit of an MPEG2 TS header to "0", to output the reset bit value to the buffer when the PID value of the MPEG-2 TS header is "0x1FFF" and the "payload unit start indicator" bit is set to "1", and discard a corresponding TS packet when the "payload unit start indicator" bit is set to "0"; and
        a third operation to output the PID value to the buffer when the PIDF value is neither "0x1FFE" nor "0x1FFF".

10. The apparatus as recited in claim 9, further comprising:
    a demodulator to demodulate an input signal into an MPEG-2 TS;
    a reference clock generator to generate a reference clock by using the timing information received from the SYNC detector; and
    a DOCSIS MAC/upper layer processor to divide the DOCSIS MAC frame into a DOCSIS management message and user data and processing the resulting data.

11. The apparatus as recited in claim 9, wherein the data rate controller controls the output data rate by Equation below $$Total\_Byte(i)=188 \times TS\_counter(i)+(18-byte\_counter(i-1))+byte\_counter(i)$$

where "TS_counter(i)", "byte_counter(i)", "Total-byte(i)", and "byte_counter(i−1)" are respectively a new MPEG-2 TS counter value, a new byte counter value, the total number of A/V MPEG-2 TS transmission bytes between two SYNC messages, and a byte counter value received by the previous SYNC message.

12. The apparatus as recited in claim 11, wherein the data rate controller controls the output data rate by Equation below $$Time\_Difference(i) = \frac{|SYNC(i) - SYNC(I-1)|}{master\_clock\_frequency}$$

where "Time_Difference(i)", "SYNC(i−1)", and "master_clock_frequency" are respectively a time difference between the two SYNC messages, a time value contained in the previous SYNC message, a frequency that the headend modem uses for generation of the SYNC message.

13. The apparatus as recited in claim 12, wherein the data rate controller controls the output data rate by Equation below $$TS\_Rate(i) = \frac{Total\_Byte(i)}{Time\_Difference(i)}$$

where "TS_Rate(i)" is an MPEG-2 TS output data rate.

* * * * *